(12) United States Patent
Wu et al.

(10) Patent No.: US 11,991,261 B1
(45) Date of Patent: May 21, 2024

(54) MIDDLEWARE SYSTEM AND SERVICE REQUEST RESULT RETURNING METHOD

(71) Applicants: Digiwin Software Co., Ltd, Shanghai (CN); DATA SYSTEMS CONSULTING CO., LTD., New Taipei (TW)

(72) Inventors: Chao-Lin Wu, New Taipei (TW); Guoxin Sun, Shanghai (CN)

(73) Assignees: Digiwin Software Co., Ltd, Shanghai (CN); DATA SYSTEMS CONSULTING CO., LTD., New Taipei (TW)

( * ) Notice: Subject to any disclaimer, the term of this patent is extended or adjusted under 35 U.S.C. 154(b) by 0 days.

(21) Appl. No.: 18/455,577

(22) Filed: Aug. 24, 2023

(30) Foreign Application Priority Data

Jun. 20, 2023 (CN) .......................... 202310736397.X

(51) Int. Cl.
*H04L 67/62* (2022.01)
*H04L 67/1004* (2022.01)

(52) U.S. Cl.
CPC .......... *H04L 67/62* (2022.05); *H04L 67/1004* (2013.01)

(58) Field of Classification Search
CPC ............................ H04L 67/62; H04L 67/1004
See application file for complete search history.

(56) References Cited

U.S. PATENT DOCUMENTS

| | | | |
|---|---|---|---|
| 6,915,376 B1 * | 7/2005 | Coulson | G11B 5/5547 711/112 |
| 2003/0191857 A1 * | 10/2003 | Terrell | H04L 45/30 709/244 |
| 2005/0157865 A1 * | 7/2005 | Yeager | G07C 11/00 379/201.04 |
| 2008/0276003 A1 * | 11/2008 | Dudley | H04L 65/1016 709/242 |
| 2013/0262678 A1 * | 10/2013 | Tung | H04L 41/069 709/226 |
| 2015/0304264 A1 * | 10/2015 | Kabbes | H04L 51/42 709/206 |
| 2021/0272062 A1 * | 9/2021 | Kim | G06Q 30/0635 |

* cited by examiner

*Primary Examiner* — Benjamin M Thieu
(74) *Attorney, Agent, or Firm* — JCIPRNET

(57) ABSTRACT

A middleware system and a service request result returning method are provided. The middleware system communicates with a service request end and a plurality of servers. A processor receives a plurality of service requests sent by the service request end, and writes the service requests into a service request queue. The service agent unit outputs the service requests to the servers according to the service request queue. The servers respond with a plurality of service request results to the service agent unit. The time agent unit detects the time when the processor receives the service requests, so as to write a plurality of service request end messages and a plurality of service request times of the service requests into a service request time queue. The message distributor builds a message distribution table, and outputs the service request results to the service request end according to the message distribution table.

20 Claims, 3 Drawing Sheets

MIDDLEWARE SYSTEM AND SERVICE REQUEST RESULT RETURNING METHOD

CROSS-REFERENCE TO RELATED APPLICATION

This application claims the priority benefit of China application serial no. 202310736397.X, filed on Jun. 20, 2023. The entirety of the above-mentioned patent application is hereby incorporated by reference herein and made a part of this specification.

BACKGROUND

Technical Field

The disclosure relates to a middleware system and a service request result returning method.

Description of Related Art

Generally, when a server receives a large number of service requests from a service request end, a large amount of operational load may be generated on the server, and poor service processing efficiency may thus be provided. Further, as affected by factors such as network load or server hardware, when the server returns the service request results to the service request end, it may also occur that the system cannot ensure that the sequence of the service request results obtained by the service request end is consistent with the sequence of the service requests sent by the service request end.

SUMMARY

The disclosure provides a middleware system and a service request result returning method capable of achieving the function of orderly load balancing.

According to an embodiment of the disclosure, the disclosure provides a middleware system configured to communicate with a service request end and a plurality of servers. The middleware system includes a storage apparatus and a processor. The storage apparatus is configured to store a service agent unit, a time agent unit, and a message distributor. The processor is electrically connected to the storage apparatus and is configured to execute the service agent unit, the time agent unit, and the message distributor. The processor receives a plurality of service requests sent by the service request end, and the processor writes the plurality of service requests into a service request queue in sequence. The service agent unit outputs the plurality of service requests to the plurality of servers according to the service request queue in sequence. The plurality of servers respond with a plurality of service request results to the service agent unit according to the plurality of service requests. The time agent unit detects the time when the processor receives the plurality of service requests, so as to write a plurality of service request end messages and a plurality of service request times of the plurality of service requests into a service request time queue in sequence. The message distributor builds a message distribution table according to the service request time queue, and the message distributor outputs the plurality of service request results to the service request end in sequence according to the message distribution table.

According to an embodiment of the disclosure, the disclosure further provides a service request result returning method suitable for a middleware system. The service request result returning method includes the following steps. The middleware system receives and writes a plurality of service requests sent by a service request end into a service request queue in sequence. The middleware system outputs the plurality of service requests to a plurality of servers in sequence according to the service request queue. The plurality of servers respond with a plurality of service request results to the middleware system according to the plurality of service requests. The middleware system detects the time when the plurality of service requests are received, so as to write a plurality of service request end messages and a plurality of service request times of the plurality of service requests into a service request time queue in sequence. The middleware system builds a message distribution table according to the service request time queue. The middleware system outputs the plurality of service request results to the service request end in sequence according to the message distribution table.

To sum up, in the middleware system and the service request result returning method provided by the disclosure, the time when the service requests are received is recorded, so that the corresponding service request results are returned in sequence. In the middleware system and the service request result returning method provided by the disclosure, load balancing is achieved, and the out-of-order behavior in the return sequence of the service request results is also effectively prevented from occurring.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
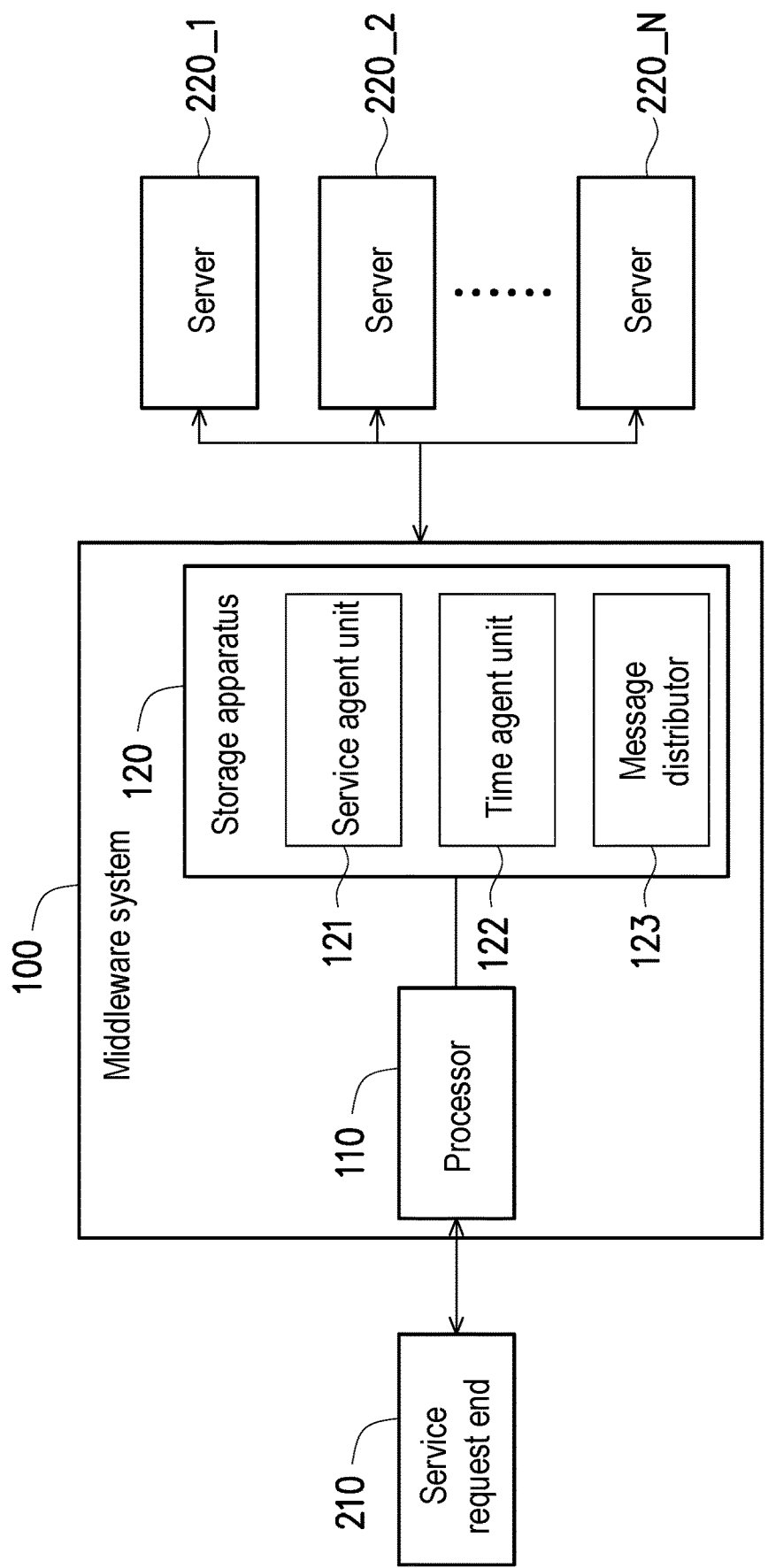
FIG. 1 is a schematic view of devices of a middleware system according to an embodiment of the disclosure.

Descriptions of the disclosure are given with reference to the exemplary embodiments illustrated by the accompanying drawings. Wherever possible, the same reference numbers are used in the drawings and the description to refer to the same or like parts.

FIG. 1 is a schematic view of devices of a middleware system according to an embodiment of the disclosure. With reference to FIG. 1, a middleware system 100 includes a processor 110 and a storage apparatus 120. The processor 110 is electrically connected to the storage apparatus 120. The middleware system 100 may include a wired and/or wireless physical communication interface, so that the middleware system 100 can communicate with a service request end 210 and a plurality of servers 220_1 to 220_N, where N is a positive integer. In this embodiment, the service request end 210 may be an electronic apparatus operated by a user or a tenant, such as a computer device, a smart phone, or a tablet computer. In an embodiment, the service request end 210 may be, for example, a local business system, and the middleware system 100 and the servers 220_1 to 220_N may be, for example, set up in the cloud, but the disclosure is not limited thereto. In this embodiment, the storage apparatus 120 is configured to store a service agent unit 121, a time agent unit 122, and a message distributor 123.

In this embodiment, at least part of the servers 220_1 to 220_N may provide the same or different services. In this embodiment, the middleware system 100 may communicate with one or plural service request ends, not limited to what is shown in FIG. 1. The middleware system 100 may receive a plurality of service requests outputted by one or plural service request ends, where at least part of the service requests may correspond to the same or different service types. The middleware system 100 may provide these service requests to corresponding servers in sequence, so that the servers 220_1 to 220_N may individually execute corresponding service programs according to the received service requests, so as to generate and return the corresponding service request results to the middleware system 100. The middleware system 100 may further output the multiple returned service request results to the corresponding service request end in an orderly manner.

In this embodiment, the service requests may be message oriented, and the middleware system 100 may be implemented by the server executing message oriented middleware (MOM), algorithms, or programs. For instance, the plurality of service requests may include execution requests (including corresponding input data) corresponding to various artificial intelligence models (AI models), and the servers 220_1 to 220_N may be used to execute different artificial intelligence models. Therefore, the middleware system 100 may also classify the plurality of service requests first and then disperses and inputs execution requests (including corresponding input data) corresponding to the same artificial intelligence model into corresponding multiple servers having the same artificial intelligence model. In this way, the corresponding multiple servers may efficiently execute the corresponding artificial intelligence models to return the corresponding output data (i.e., artificial intelligence processing result) to the middleware system 100, and finally, the middleware system 100 returns the output data to the corresponding service request end in sequence.

In this embodiment, the processor 110 may be, for example, a system on a chip (SOC), or may include, for example, a central processing unit (CPU), a programmable microprocessor for general or special use, a digital signal processor (DSP), a programmable controller, an application specific integrated circuit (ASIC), a programmable logic device (PLD), other similar devices, or a combination of the foregoing devices. In this embodiment, the storage apparatus 120 may be, for example, a dynamic random access memory (DRAM), a flash memory, or a non-volatile random access memory (NVRAM), and the like. In this embodiment, the storage apparatus 120 may be configured to store related data and related messages described in various embodiments of the disclosure. The storage apparatus 120 may be configured to store the algorithms and programs of the service agent unit 121, the time agent unit 122, and the message distributor 123 for access and/or execution by the processor 110. The storage apparatus 120 may also temporarily store relevant data required or generated by the middleware system 100 during operation. In addition, each of the service request end 210 and the servers 220_1 to 220_N may also have, for example, the abovementioned processor and storage apparatus.

Figure 2:
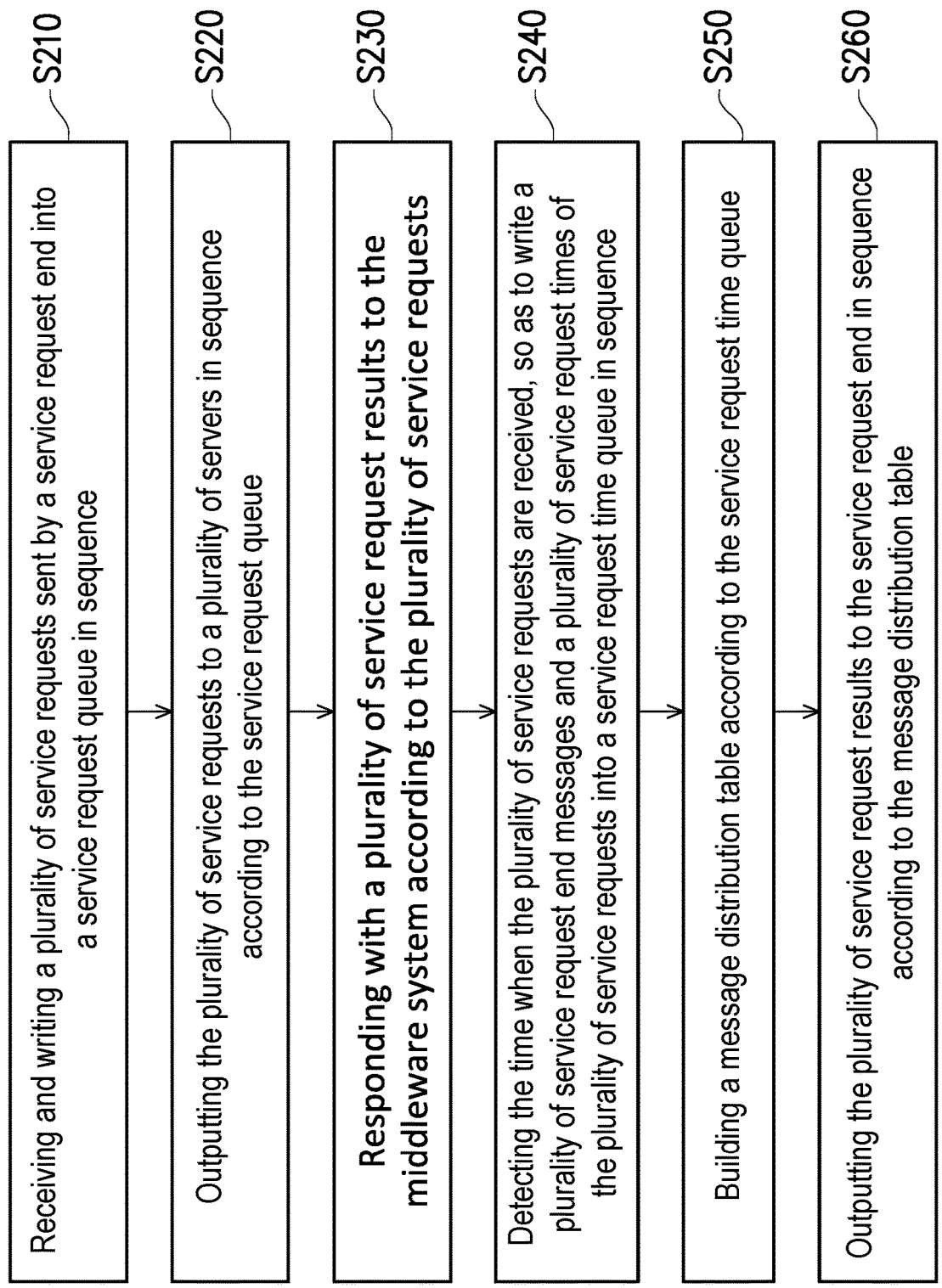
FIG. 2 is a flow chart of a service request result returning method according to an embodiment of the disclosure.

FIG. 2 is a flow chart of a service request result returning method according to an embodiment of the disclosure. With reference to FIG. 1 and FIG. 2, the middleware system 100 may execute the following steps S210 to S260. In step S210, the middleware system 100 may receive and write a plurality of service requests sent by the service request end 210 into a service request queue in sequence. In this embodiment, the middleware system 100 may store the instructions and/or data of the plurality of service requests in sequence according to the sequence in which the requests are received through the service request queue. In step S220, the middleware system 100 may output the plurality of service requests to the plurality of servers 220_1 to 220_N in sequence according to the service request queue. In step S230, the servers 220_1 to 220_N respond with a plurality of service request results to the middleware system 100 according to the plurality of service requests. In this embodiment, it is taken as an example that the servers 220_1 to 220_N provide service programs of the same service type, and the plurality of service requests also correspond to the same service type. The processor 110 of the middleware system 100 may execute the service agent unit 121 and send the plurality of service requests to the servers 220_1 to 220_N in sequence by polling the servers 220_1 to 220_N. In this way, the middleware system 100 may implement a load balancing function to balance the use of the servers 220_1 to 220_N.

In step S240, the middleware system 100 may detect the time when the plurality of service requests are received, so as to write a plurality of service request end messages and a plurality of service request times (i.e., the time when the system receives the service requests or the time when the service request end 210 sends the service requests) corresponding to the plurality of service requests into a service request time queue in sequence. In this embodiment, the processor 110 of the middleware system 100 may execute the time agent unit 122 to mark the individual service request times of the plurality of service requests.

In step S250, the middleware system 100 may build a message distribution table according to the service request time queue. In step S260, the middleware system 100 may output the plurality of service request results to the service request end 210 in sequence according to the message distribution table. In this embodiment, the processor 110 of the middleware system 100 may execute the message distributor 123 to build the message distribution table according to the service request time queue. The message distributor 123 may record the plurality of service request results returned by the servers 220_1 to 220_N into the message distribution table to correspond to the plurality of service requests. Further, when the message distributor 123 (or service agent unit 121) determines that a first service request result corresponding to a first service request is received according to the message distribution table, the processor 110 may return the first service request result corresponding to the first service request to the service request end 210. Next, when the message distributor 123 determines that a second service request result corresponding to a second service request is received according to the message distribution table, the processor 110 may return the second service request result corresponding to the second service request to the service request end 210. However, if the message distributor 123 determines that the second service request result corresponding to the second service request is received but the first service request result corresponding to the first service request is not yet received according to the message distribution table, the processor 110 may retain the second service request result corresponding to the second service request until the first service request result corresponding to the first service request is received, and then returns the first service request result and the second service request result to the service request end 210 in sequence. In an embodiment, the processor 110 may also directly output the second service request result to the service request end 210 after the message distributor 123 waits for a predetermined time without receiving the first service request result.

Therefore, in the middleware system 100 and the service request result returning method provided by this embodiment, the function of orderly load balancing may be achieved, so as to efficiently run the servers 220_1 to 220_N to perform multiple service processing functions.

Figure 3:
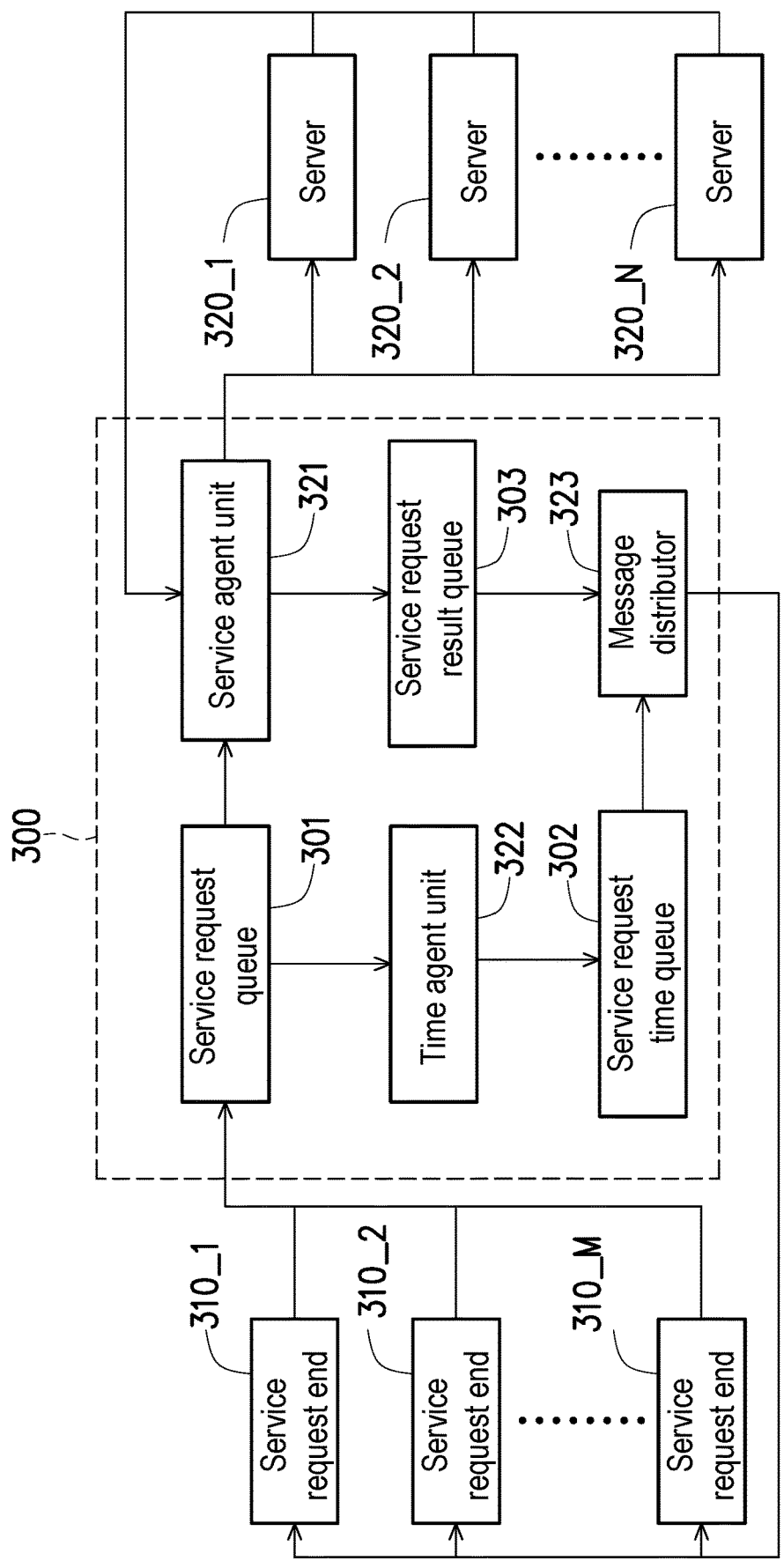
FIG. 3 is a schematic diagram of an operation of orderly load balancing performed by a middleware system according to an embodiment of the disclosure.

FIG. 3 is a schematic diagram of an operation of orderly load balancing performed by a middleware system according to an embodiment of the disclosure. With reference to FIG. 3, in this embodiment, the abovementioned multiple queues and the message distribution table are further specifically described. In this embodiment, a middleware system 300 may receive a plurality of service requests sent by a plurality of service request ends 310_1 to 310_M, where M is a positive integer. The middleware system 300 may write the plurality of service requests into a service request queue 301 in sequence to record a service request sequence of the service request ends. In this embodiment, the middleware system 300 may output the plurality of service requests to the plurality of servers 320_1 to 320_N in sequence according to the service request queue 301. The middleware system 300 may evenly distribute the plurality of service requests to the servers 320_1 to 320_N by polling the servers 320_1 to 320_N in sequence according to the service types of the plurality of service requests, so as to distribute and execute the plurality of service requests outputted by the service request end 310_1 to 310_M.

For instance, with reference to the following Table 1, the requests stored in the service request queue 301 may be arranged as shown in Table 1, where the receiving sequence is, for example, 1 to K, and K is a positive integer. The symbol A(M,1) is used to represent the first service request outputted by the $M^{th}$ service request end 310_M. The symbol A(1,1) is used to represent the first service request outputted by the first service request end 310_1. The symbol A(M,2) is used to represent the second service request outputted by the $M^{th}$ service request end 310_M. The symbol A(2,1) is used to represent the first service request outputted by the second service request end 310_2. The symbol A(1,P) is used to represent the last service request outputted by the first service request end 310_1. P is a positive integer. As shown in Table 1, the sequence in which the service request ends 310_1 to 310_M send service requests may be random.

TABLE 1

| Receiving Order | 1 | 2 | 3 | 4 | ... | K |
|---|---|---|---|---|---|---|
| Service Request | A (M, 1) | A (1, 1) | A (M, 2) | A (2, 1) | ... | A (1, P) |

In this embodiment, at least part of the servers 320_1 to 320_N may be configured to provide the same service. At least part of the plurality of service requests may correspond to the same service. In an embodiment, if at least part of the plurality of service requests correspond to different service types, the middleware system 300 may also perform service type classification on the plurality of service requests and then writes the plurality of service requests into different service request queues corresponding to different service type classifications in sequence according to the service type classification.

In this embodiment, the time agent unit 322 may detect the time when the plurality of service requests are received, so as to write a plurality of service request end messages, a plurality of service request times, and a plurality of universally unique identifiers (UUIDs) of the plurality of service requests into a service request time queue 302 in sequence. In this embodiment, the plurality of universally unique identifiers are generated by the service request ends 310_1 to 310_M at send the service requests. Alternatively, in an embodiment, when the middleware system 300 receives the plurality of service requests, the middleware system 300 may generate the plurality of universally unique identifiers of the plurality of service requests in sequence. In other words, the servers 320_1 to 320_N may include a universally unique identifier generating unit, or the middleware system 300 may include a unique identifier generating unit.

Continuing with the above example, with reference to Table 2 below, the queue content stored in the service request time queue 302 may be as shown in Table 2. In this regard, the queue sequence of the service requests stored in the service request time queue 302 may be the same as the receiving sequence shown in Table 1 above, and each service request in the service request time queue 302 further includes messages about the corresponding service request time and the universally unique identifier.

TABLE 2

| Queue Sequence | 1 | 2 | 3 | 4 | ... | K |
|---|---|---|---|---|---|---|
| Service Request | A (M, 1) | A (1, 1) | A (M, 2) | A (2, 1) | ... | A (1, P) |

In this embodiment, the servers 320_1 to 320_N may respond with a plurality of service request results to a service agent unit 321 according to the plurality of service requests. It should be noted that the time for the servers 320_1 to 320_N to respond with the service request results may be determined according to the time required for each individual service function, rather than according to the sequence or time of receiving the service requests. In other words, the sequence in which the service agent unit 321 outputs the plurality of service requests may be different from the sequence in which the service request results returned by the servers 320_1 to 320_N are received. In this embodiment, the service agent unit 321 may write the plurality of service request results into a service request result queue 303 in sequence.

Continuing with the above example, with reference to Table 3 below, the queue content stored in the service request result queue 303 may be as shown in Table 3. The symbol B(M,2) is used to represent the service request result corresponding to the second service request outputted by the $M^{th}$ service request end 310_M. The symbol B(2,1) is used to represent the service request result corresponding to the first service request outputted by the second service request end 310_2. The symbol B(M,1) is used to represent the service request result corresponding to the first service request outputted by the $M^{th}$ service request end 310_M. The symbol B(1,1) is used to represent the service request result corresponding to the first service request outputted by the first service request end 310_1. The symbol B(3,R) is used to represent the service request result corresponding to the last service request outputted by the third service request end 310_M. R is a positive integer. As shown in Table 3, the sequence of the service request results returned by the servers 320_1 to 320_N may be random.

TABLE 3

| Queue Sequence | 1 | 2 | 3 | 4 | ... | K |
|---|---|---|---|---|---|---|
| Service Request Result | B (M, 2) | B (2, 1) | B (M, 1) | B (1, 1) | ... | B (3, R) |

In this embodiment, the message distributor 323 may build a message distribution table according to the service request time queue 302 and the service request result queue 303, so as to build a temporary data structure of the service requests. The message distributor 323 may output the plurality of service request results to the service request ends 310_1 to 310_M in sequence according to the message distribution table. In this embodiment, the message distribution table is configured to record the plurality of service request end messages, the plurality of service request times, and the plurality of universally unique identifiers of the plurality of service requests and a plurality of service request result messages. Further, the plurality of service request result messages are sorted according to the plurality of service request times.

In this embodiment, the message distributor 323 may fill the corresponding service request result into the field of the service request result reserved for the corresponding service request in the temporary storage data structure in the message distribution table. Continuing with the above example, with reference to Table 4 below, the message distribution table may be as shown in Table 4, where the number of time is only used to indicate the sequence of receiving requests. The number of the universally unique identifier is only used to indicate that each service request has a different universally unique identifier. The number of the service request result is only used to indicate that a response to the service result request is received. If the field of the service request result is empty, it means that the corresponding service request result is not received yet.

TABLE 4

| | Time | Universally Unique Identifier | Service Request Result |
|---|---|---|---|
| Service Request End 310_1 | 005 | 3aa9e279 | {A, 78, 139} |
| | 012 | a5069ad3 | {O, 85, 110} |
| | 035 | C9b1463d | |
| Service Request End 310_2 | 010 | A735faa8 | {AB, 135, 187} |
| | 013 | 9765a05b | |
| | 019 | 93f5b7d3 | {O, 70, 110} |
| ... | ... | ... | ... |
| Service Request End 310_M | 001 | 736f211c | {B, 65, 117} |
| | 007 | 671ef712 | {O, 75, 1120} |
| | 015 | D59aa851 | {AB, 120, 190} |

In this embodiment, the message distributor 323 may outputs the plurality of service request results to the service request ends 310_1 to 310_M in sequence according to a sorting result of the plurality of service request result messages. Taking the above Table 4 as an example, the message distributor 323 may determine that the first service request result {A, 78, 139} and the second service request result {O, 85, 110} corresponding to the first service request and the second service request sent by the service request end 310_1 are received, so that the message distributor 323 may send the first service request result {A, 78, 139} and the second service request result {O, 85, 110} to the service request end 310_1 in sequence. Further, the message distributor 323 may determine that the first service request result {AB,135,187} and a third service request result {O,70,110} corresponding to the first service request and the third service request sent by the service request end 310_2 are received, so that the message distributor 323 may send the first service request result {AB,135,187} to the service request end 310_2, save the third service request result {0, 70, 110} until receiving the second service request result corresponding to the second service request sent by the service request end 310_2, and then send the service request results to the service request end 310_2 in sequence. Further, the message distributor 323 may determine that the first service request result {B,65,1171}, the second service request end {O,75,1120}, and the third service request result {AB,120,190} corresponding to the first service request, the second service request, and the third service request sent by the service request end 310_M are received, so that the message distributor 323 may send the first service request result {B,65,117}, the second service request end {O,75, 1120}, and the third service request result {AB,120,190} of the first service request, the second service request, and the third service request to the service request end 310_M in sequence. It should be noted that, when the service request result is correctly returned, the message distributor 323 may delete the returned service request record. In this way, the middleware system 300 may send the service request results to the service request ends 310_1 to 310_M in an orderly manner.

In an embodiment, the middleware system 300 may further include a plurality of message sending queues corresponding to different service request ends. The message distributor 323 may input the service request results into these message sending queues according to the return rules of the above service request results. These message sending queues may be used to temporarily store service request results corresponding to different service request ends according to the sequence in which the service requests are received. In this way, the service request ends 310_1 to 310_M may retrieve the corresponding service request results in sequence from the corresponding message sending queues.

In view of the foregoing, in the middleware system and the service request result returning method provided by the disclosure, the service requests of the service request ends may be effectively distributed and executed, and the service request results may be sent back to the corresponding service request ends in sequence, so that the function of orderly load balancing is achieved.

Finally, it is worth noting that the foregoing embodiments are merely described to illustrate the technical means of the disclosure and should not be construed as limitations of the disclosure. Even though the foregoing embodiments are referenced to provide detailed description of the disclosure, people having ordinary skill in the art should understand that various modifications and variations can be made to the technical means in the disclosed embodiments, or equivalent replacements may be made for part or all of the technical features; nevertheless, it is intended that the modifications, variations, and replacements shall not make the nature of the technical means to depart from the scope of the technical means of the embodiments of the disclosure.

What is claimed is:

1. A middleware system configured to communicate with a service request end and a plurality of servers, wherein the middleware system comprises:
   a storage apparatus configured to store a service agent unit, a time agent unit, and a message distributor; and
   a processor electrically connected to the storage apparatus and configured to execute the service agent unit, the time agent unit, and the message distributor,
   wherein the processor receives a plurality of service requests sent by the service request end, and the processor writes the plurality of service requests into a service request queue in sequence,
   wherein the service agent unit outputs the plurality of service requests to the plurality of servers according to the service request queue in sequence, and the plurality of servers respond with a plurality of service request results to the service agent unit according to the plurality of service requests,
   wherein the time agent unit detects the time when the processor receives the plurality of service requests, so as to write a plurality of service request end messages and a plurality of service request times of the plurality of service requests into a service request time queue in sequence,
   wherein the message distributor builds a message distribution table according to the service request time queue, and the message distributor outputs the plurality of service request results to the service request end in sequence according to the message distribution table.

2. The middleware system according to claim 1, wherein the service agent unit writes the plurality of service request results into a service request result queue in sequence, and the message distributor updates the message distribution table according to the service request result queue.

3. The middleware system according to claim 1, wherein the time agent unit writes the plurality of service request end messages, the plurality of service request times, and a plurality of universally unique identifiers of the plurality of service requests into the service request time queue in sequence.

4. The middleware system according to claim 3, wherein the message distribution table is configured to record the plurality of service request end messages, the plurality of service request times, and the plurality of universally unique identifiers of the plurality of service requests and a plurality of service request result messages, and the service request result messages are sorted according to the service request times.

5. The middleware system according to claim 4, wherein the message distributor outputs the plurality of service request results to the service request end in sequence according to a sorting result of the plurality of service request result messages.

6. The middleware system according to claim 5, wherein the service request results comprise a first service request result and a second service request result, wherein when the message distribution table records that the second service request result is received and the first service request result is not received, the message distributor waits to receive the first service request result, outputs the first service request result to the service request end, and then outputs the second service request result to the service request end.

7. The middleware system according to claim 6, wherein the message distributor directly outputs the second service request result to the service request end after waiting for a predetermined time without receiving the first service request result.

8. The middleware system according to claim 3, wherein the plurality of universally unique identifiers are generated by the service request end.

9. The middleware system according to claim 3, wherein when the processor receives the plurality of service requests, the processor generates the plurality of universally unique identifiers of the plurality of service requests in sequence.

10. The middleware system according to claim 1, wherein the middleware system communicates with a plurality of service request ends, and the service agent unit distributes the plurality of service requests to the plurality of servers in a balanced manner.

11. The middleware system according to claim 1, wherein at least part of the plurality of servers are configured to provide a same service.

12. The middleware system according to claim 1, wherein at least part of the plurality of service requests correspond to a same service.

13. The middleware system according to claim 1, wherein the processor performs service type classification on the plurality of service requests and writes the plurality of service requests into different service request queues in sequence according to the service type classification.

14. A service request result returning method suitable for a middleware system, wherein the service request result returning method comprises:
   receiving and writing, through the middleware system, a plurality of service requests sent by a service request end into a service request queue in sequence;
   outputting, through the middleware system, the plurality of service requests to a plurality of servers in sequence according to the service request queue;
   responding with, through the plurality of servers, a plurality of service request results to the middleware system according to the plurality of service requests;
   detecting, through the middleware system, the time when the plurality of service requests are received, so as to write a plurality of service request end messages and a plurality of service request times of the plurality of service requests into a service request time queue in sequence;
   building, through the middleware system, a message distribution table according to the service request time queue; and
   outputting, through the middleware system, the plurality of service request results to the service request end in sequence according to the message distribution table.

15. The service request result returning method according to claim 14, wherein the middleware system writes the plurality of service request results into a service request result queue in sequence, and the middleware system updates the message distribution table according to the service request result queue.

16. The service request result returning method according to claim 14, wherein the middleware system writes the plurality of service request end messages, the plurality of service request times, and a plurality of universally unique identifiers of the plurality of service requests into the service request time queue in sequence.

17. The service request result returning method according to claim 16, wherein the message distribution table is configured to record the plurality of service request end messages, the plurality of service request times, and the plurality of universally unique identifiers of the plurality of service requests and a plurality of service request result messages, and the plurality of service request result messages are sorted according to the plurality of service request times.

18. The service request result returning method according to claim 17, wherein the middleware system outputs the plurality of service request results to the service request end in sequence according to a sorting result of the plurality of service request result messages.

19. The service request result returning method according to claim 18, wherein the service request results comprise a first service request result and a second service request result, wherein when the message distribution table records that the second service request result is received and the first service request result is not received, the middleware system waits to receive the first service request result, outputs the first service request result to the service request end, and then outputs the second service request result to the service request end.

20. The service request result returning method according to claim 19, wherein the middleware system directly outputs the second service request result to the service request end after waiting for a predetermined time without receiving the first service request result.

* * * * *